Patented Jan. 18, 1949

2,459,754

UNITED STATES PATENT OFFICE 2,459,754

PURIFICATION OF PHENOL SULFIDES AND PREPARATION OF METALLIC SALTS THEREOF

Harry E. Albert, Akron, Ohio, assignor to The Firestone Tire & Rubber Company, Akron, Ohio, a corporation of Ohio No Drawing. Application May 23, 1946, Serial No. 671,908

9 Claims. (Cl. 260—429)

This invention relates to an improved process of producing metal salts of phenol sulfides, and especially tin salts thereof. More particularly, the invention relates to the preparation of such metal salts from a reaction product of a phenol and a sulfur chloride, which reaction product contains sulfur present in the free state and/or in polysulfide linkages, and the extraction of the free and/or polysulfide sulfur therefrom as a step in the production of the metal salt.

The metal salts of phenol sulfides have been found useful in the treatment of petroleum oils and rubber and rubber-like materials, etc. For such purposes, a colorless salt of a phenol sulfide as well as a purer salt is preferred to the highly colored impure salts now available.

If crude phenol sulfides—i. e., phenol sulfide which contains sulfur in polysulfide linkages or in the free state—are used in the preparation of salts of metals, such as tin or antimony, etc., the sulfur impurities in the phenol sulfides cause the products to be colored. For example, in the case of stannous salts, a brick-red product is obtained. The invention, therefore, has particular value in the preparation of salts of tin and other metals whose sulfides are highly colored although it is not limited thereto.

According to this invention the metal salt is obtained substantially pure. Phenol and a sulfur chloride—e. g., sulfur monochloride or sulfur dichloride—are reacted to produce a phenol sulfide which contains free and/or polysulfide sulfur, and this is treated with aqueous alkali metal sulfite or alkaline earth metal sulfite to remove any free and polysulfide sulfur which may be present before reacting with a salt of the metal whose phenol sulfide is ultimately desired. The aqueous sulfite may be used either to extract the phenol sulfide in solid form or to extract a solution of the phenol sulfide in an inert organic solvent. After extraction with the sulfite, the sulfite solution is preferably, although not necessarily, separated from the phenol sulfide before conversion to the metal salt. A preferred process of producing a metal salt of a phenol sulfide involves extraction of the solid, water-insoluble, free and/or polysulfide sulfur-containing reaction product of phenol and sulfur chloride with a water solution of an alkali metal sulfite followed by washing and drying, and then preparation of an anhydrous alkali or alkaline earth metal salt of the extracted phenol sulfide by reaction with the corresponding alcoholate or hydroxide with resultant reaction with the chloride of the metal whose phenol sulfide is desired. To produce the stannous salt, it is preferable to use the stannous chloride in an inert solvent, such as absolute alcohol or methanol. Preparation of the stannous salt in an aqueous medium is possible, but some hydrolysis of the stannous salt almost always occurs. Although the examples relate more particularly to the preparation of stannous salts, it is obvious that other salts may be similarly prepared by using chlorides of other metals, such as antimony, bismuth, zinc, cadmium, lead, etc.

The following examples illustrate the invention:

EXAMPLE 1

*The stannous salt of 4-tert-amylphenol sulfide*

One hundred grams of crude 4-tert-amylphenol sulfide, prepared by reacting 4-tert-amylphenol with sulfur dichloride, were treated in solid form with a solution of 30 grams of sodium sulfite in 600 milliliters of water for 1 hour on the steam bath. The sulfite solution was removed, and the extracted sulfide washed and dried. Twelve and nine-tenths grams of sodium were dissolved in 500 cubic centimeters of absolute methanol and the extracted and dried 4-tert-amylphenol sulfide added to the resulting solution. To this a methanol solution of 59.5 grams of anhydrous stannous chloride was added. A white precipitate of the stannous salt of 4-tert-amylphenol sulfide was obtained which weighed 92.0 grams after drying. It melts to a clear amber liquid at 260–280° C.

The stannous salt of this phenol sulfide, similarly prepared but omitting the extraction with sodium sulfite, is brick red.

EXAMPLE 2

*The stannous salt of diphenol sulfide*

Ten grams of crude diphenol sulfide prepared by reacting phenol with sulfur dichloride were digested in 100 milliliters of 5 per cent aqueous sodium sulfite for 1 hour on a steam bath. The product was filtered and washed after cooling to room temperature. The precipitate was crystallized from 25 per cent acetic acid. Five grams of the diphenol sulfide thus obtained was dissolved in a solution of 1.85 grams of sodium hydroxide in 200 milliliters of water. A solution of 4.35 grams of stannous chloride (anhydrous) in 50 cubic centimeters of 10 per cent sodium chloride was added during stirring. The resulting precipitate was filtered, washed, and dried. The yield was 3.8 grams. The precipitate, which was the stannous salt of diphenol sulfide, was a white powder turning brown on heating to 220–230° C., melting to a clear liquid at 240–245° C. and decomposing at 255–260° C.

EXAMPLE 3

*The stannous salt of 4-tert-butyl-3-methylphenol sulfide*

Thirty-five and seven-tenths grams of crude 4-tert-butyl-3-methylphenol sulfide prepared by reacting 4-tert-butyl-3-methylphenol with sulfur dichloride were dissolved in 70 milliliters of benzene, and this solution was extracted for ½ hour with 300 milliliters of 5 per cent aqueous solution of sodium sulfite, with the help of mechanical agitation. The benzene solution was separated off and washed with 400 cubic centimeters of water. After drying, this benzene solution was added to a solution prepared by dissolving 4.6 grams of metallic sodium in 150 milliliters of absolute methanol. After standing for 5 minutes, a solution of 19 grams of anhydrous stannous chloride in 50 milliliters of absolute methanol was slowly added. A white precipitate of the stannous salt of 4-tert-butyl-3-methylphenol sulfide was formed which was filtered and found to weigh 20 grams after drying. An additional amount of product was obtained by evaporation of the solvent.

The dry precipitate was light yellow in color and did not melt on heating. It gradually darkened in color as the temperature was raised and finally decomposed.

EXAMPLE 4

*Antimony salt of di(1-hydroxy-3-methyl-4,6-di-tert-butylphenol) sulfide*

The reaction product of 4,6-di-tert-butyl-m-cresol and sulfur monchloride was dissolved in benzene and treated at 75° C. for 1 hour with a 5 per cent sodium sulfite solution. The benzene layer was separated and the purified sulfide precipitated from the solution by the addition of petroleum ether and cooling.

Four and seven-tenths grams of the resulting product were dissolved in a anhydrous methanol solution of sodium methanol prepared by dissolving 0.46 gram of sodium metal in 500 milliliters of anhydrous methanol. The resulting reaction mixture was refluxed for about 3 hours, and then a solution of 1.5 grams of antimony trichloride in 100 milliliters of absolute methanol was added slowly during stirring. The methanol was then distilled off and sodium-dried benzene added to dissolve the product. A small amount of benzene was distilled off to remove the residual methanol. After cooling, the solution was filtered to remove the sodium chloride present in the reaction product. Evaporation of the benzene solution gave a light yellow product weighing 5.3 grams. It melted at 225–235° C. with decomposition to a clear dark green liquid.

The separation of the sodium sulfite solution before the preparation of the tin or other salt is not absolutely necessary although separation is the preferred procedure. In the following example a product of improved color, but not colorless, is obtained by preparation of the tin salt in the presence of the sulfite solution.

EXAMPLE 5

*Stannous salt of diphenol sulfide*

Twenty-two grams of crude diphenol sulfide, prepared by reacting phenol with sulfur dichloride in ethylene dichloride, were treated with a solution of 7 grams of sodium sulfite in 200 milliliters of water for 1 hour at room temperature. A solution of 8 grams of sodium hydroxide in 100 milliliters of water was added, and this was followed by the slow addition of 19 grams of anhydrous stannous chloride in 150 milliliters of water. Filtering and drying the resulting precipitate gave 34.5 grams of a light brownish-yellow product. Using the same procedure without the sodium sulfite treatment, a red precipitate was obtained.

It is to be understood that the details of the specific processes are not essential to the invention, that the metal salts may be prepared by other processes, and that the processes of the examples are generally applicable to the preparation of metal salts so that the phenol sulfide salts of other metals may be formed by the processes disclosed, and that other variations from the disclosure may be made without departing from the scope of the invention as defined in the appended claims.

What I claim is:

1. The process of purifying a phenol sulfide which contains impurity of the class consisting of free sulfur and polysulfide sulfur resulting from the reaction of the phenol and a sulfur chloride, which process comprises treating the phenol sulfide with an aqueous solution of a sulfite of the class consisting of alkali metal sulfites and alkaline earth metal sulfites and thereby removing at least some of said impurity.

2. The process of purifying a phenol sulfide which contains impurity of the class consisting of free sulfur and polysulfide sulfur resulting from the reaction of the phenol and a sulfur chloride, which process comprises extracting the phenol sulfide in solid form with an aqueous solution of a sulfite of the class consisting of alkali metal sulfites and alkaline earth metal sulfites and thereby removing at least some of said impurity.

3. The process of purifying a phenol sulfide which contains impurity of the class consisting of free sulfur and polysulfide sulfur resulting from the reaction of the phenol and a sulfur chloride, which process comprises extracting the phenol sulfide in solution in an inert solvent immiscible with water, with an aqueous solution of a sulfite of the class consisting of alkali metal sulfites and alkaline earth metal sulfites and thereby removing at least some of said impurity.

4. The process of purifying a phenol sulfide obtained by reacting a phenol with a sulfur chloride, comprising extracting the phenol sulfide with an aqueous solution of a sulfite of the class consisting of alkali metal sulfites and alkaline earth metal sulfites.

5. The method of purifying a phenol sulfide which contains free sulfur as an impurity, which comprises extracting the phenol sulfide with an aqueous solution of a sulfite of the class consisting of alkali metal sulfites and alkaline earth metal sulfites to dissolve the free sulfur from the phenol sulfide.

6. The process of purifying a phenol sulfide which contains as an impurity polysulfide sulfur resulting from the reaction of the phenol and a sulfur chloride, which comprises extracting the phenol sulfide with an aqueous solution of a sulfite of the class consisting of alkali metal sulfites and alkaline earth metal sulfites to dissolve the polysulfide sulfur from the phenol sulfide.

7. The process of producing the stannous salt of a phenol sulfide which comprises reacting a phenol with a sulfur chloride to produce a phenol sulfide which contains impurity of the class consisting of free sulfur and polysulfide sulfur, extracting the phenol sulfide in solid form with an aqueous solution of an alkali metal sulfite to dissolve impurity therefrom, and without separation of the resulting sulfite solution converting the phenol sulfide to the stannous salt thereof.

8. The process of producing metal salt of a phenol sulfide, which comprises reacting a phenol with a sulfur chloride to produce a phenol sulfide containing impurity of the class consisting of free sulfur and polysulfide sulfur, extracting the phenol sulfide with an aqueous solution of an alkali metal sulfite to dissolve the impurity therefrom, and without separation of the resulting sulfite solution converting the phenol sulfide to a metal salt thereof.

9. The process of producing a purified phenol sulfide which comprises reacting the phenol with a sulfur chloride and treating the product with an aqueous solution of sodium sulfite.

HARRY E. ALBERT.

REFERENCES CITED

The following references are of record in the file of this patent:

UNITED STATES PATENTS

| Number | Name | Date |
| --- | --- | --- |
| 2,207,719 | Cohen et al. | July 16, 1940 |
| 2,246,712 | Barth | June 24, 1941 |
| 2,249,626 | Cook et al. | July 15, 1941 |
| 2,270,183 | Cook et al. | Jan. 13, 1942 |
| 2,278,498 | Shoemaker | Apr. 7, 1942 |
| 2,310,449 | Lightbown | Feb. 9, 1943 |
| 2,336,074 | Cook et al. | Dec. 7, 1943 |
| 2,346,826 | Cook et al. | Apr. 18, 1944 |
| 2,362,289 | Mikeska et al. | Nov. 7, 1944 |

OTHER REFERENCES

Bichowsky, Chem. Abstracts, vol. 17, p. 3641 (1923).

Watson et al., Chem. Abstracts, vol. 18, p. 1255 (1924).

Watson et al., Chem. Abstracts, vol. 20, p. 1363 (1926).